United States Patent
Handel et al.

(10) Patent No.: US 9,438,621 B2
(45) Date of Patent: Sep. 6, 2016

(54) DENDRITIC CELL ALGORITHM MODULE WITH INFLAMMATORY INTER-NODE SIGNALING

(71) Applicant: The Boeing Company, Huntington Beach, CA (US)

(72) Inventors: Mark Jonathan Handel, Seattle, WA (US); Douglas Alan Stuart, St. Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 3 days.

(21) Appl. No.: 14/333,875

(22) Filed: Jul. 17, 2014

(65) Prior Publication Data

US 2016/0021120 A1    Jan. 21, 2016

(51) Int. Cl.
G06F 12/14 (2006.01)
H04L 29/06 (2006.01)
H04L 29/08 (2006.01)

(52) U.S. Cl.
CPC .......... H04L 63/145 (2013.01); H04L 67/12 (2013.01)

(58) Field of Classification Search
None
See application file for complete search history.

(56) References Cited

U.S. PATENT DOCUMENTS

| | | | |
|---|---|---|---|
| 2012/0021768 A1* | 1/2012 | Rudland | G06N 3/126 455/456.1 |
| 2012/0130929 A1* | 5/2012 | Cantin | G06N 3/126 706/13 |

OTHER PUBLICATIONS

Ou et al., Multiagent-Based Dendritic Cell Algorithm with Applications in Computer Security, Apr. 2011, 466-475.*

Zheng et al., Principle and Application of Dendritic Cell Algorithm for Intrusion Detection, 2011, IPCSIT vol. 48, http://www.ipcsit.com/vol48/015-ICSPS2011-S0177.pdf.*

Greensmith, Julie, et al, Articulation and Clarification of the Dendritic Cell Algorithm; Lecture Notes in Computer Science vol. 4163, pp. 404-417 , UK Jan. 1, 2006.

Greensmith, Julie, et al, Dendritic Cells for SYN Scan Detection; Proceedings of the Genetic and Evolutionary Computation Conference (GECCO 2007) Jan. 1, 2007.

Al-Hammadi, Yousof, DCA for Bot Detection; Proceedings of the IEEE World Congress on Computational Intelligence (WCCI2008), Hong King Jan. 1, 2008.

Gu, Feng, et al, Exploration of the Dendritic Cell Algorithm Using the Duration Calculus; Proceedings of 8th International Conference on Artificial Immune Systems (ICARIS 2009) , York, UK Jan. 1, 2001.

Gu, Feng, et al, Quiet in Class: Classification, Noise and the Dendritic Cell Algorithm; Proceedings of the 10th International Conference on Artificial Immune Systems (ICARIS 2011), LNCS vol. 6825, pp. 173-186, Cambridge, UK Jan. 1, 2011.

Greensmith, Julie, The Deterministic Dendritic Cell Algorithm; Lecture Notes in Computer Science vol. 5132, pp. 291-302, Phuket, Thailand Aug. 10, 2008.

(Continued)

Primary Examiner — Brandon Hoffman
(74) Attorney, Agent, or Firm — Parsons Behle & Latimer

(57) ABSTRACT

Artificial Immune Systems (AIS) including the Dendritic Cell Algorithm (DCA) are an emerging method to detect malware in computer systems. An implementation of the DCA may detect anomalous behavior in various embedded network systems. Unlike previous approaches, the DCA implementation may use an inflammation signal to communicate information among the nodes of a distributed or centralized network, where the inflammatory signal indicates a likelihood to the connected nodes that a local node has been attacked by malicious software.

22 Claims, 6 Drawing Sheets

(56) References Cited

OTHER PUBLICATIONS

Greensmith, Julie, et al, Introducing Dendritic Cells as a Novel Immune-Inspired Algorithm for Anomaly Detection; 4th International Conference, ICARIS 2005, pp. 153-167, Banff, Alberta, Canada Aug. 14, 2005.

Gu, Feng, et al, Integrating Real-Time Analysis With the Dendritic Cell Algorithm Through Segmentation ; In Genetic and Evolutionary Computation Conference (GECCO 09), Montreal Quebec, Canada Jul. 8, 2009.

* cited by examiner

DENDRITIC CELL ALGORITHM MODULE WITH INFLAMMATORY INTER-NODE SIGNALING

FIELD OF THE DISCLOSURE

The present application relates generally to computing security, and more particularly to malware detection systems and methods based on the Dendritic Cell Algorithm (DCA).

BACKGROUND

Malware (viruses, trojans, "advanced persistent threats," etc.) represents a significant potential risk in embedded network systems, such as, for example, computer networks in factory control systems. Safeguarding the integrity of a given network is often an important task for ensuring the overall safety of critical systems. As a result, detection of viruses and malware is an increasingly critical task in embedded systems.

Unfortunately, recent trends demonstrate that malware creators are willing to dedicate significant time and resources to the dissemination of malware, and the malware can often be cloaked and hidden in sophisticated ways. Usefully, viruses and hosts have been waging an on-going war in the biological domain for many centuries. The outcome of the biological war has been a remarkably sophisticated and subtle system that can quickly detect, attack, and kill harmful invaders, while managing to avoid not only damage to the self, but also killing other symbiotic organisms in the body.

Artificial immune systems (AIS) are a collection of algorithms developed from models or abstractions of the function of the cells of the human immune ne system. One category of AIS is based on the Danger Theory; and includes the Dendritic Cell Algorithm (DCA), which is based on the behavior of Dendritic Cells (DCs) within the human immune system. DCs have the power to suppress or activate the immune system through the correlation of signals from an environment, combined with location markers in the form of antigen. The function of a DC is to instruct the immune system to act when the body is under attack, policing the tissue for potential sources of damage. DCs are natural anomaly detectors, the sentinel cells of the immune system. The DCA has demonstrated potential as a static classifier for a machine learning data set and anomaly detector for real-time port scan detection.

The DCA has been described in a number of references, including Greensmith, Aickelin and Twycross, *Articulation and Clarification of the Dendritic Cell Algorithm*. In Proc. of the 5th International Conference on Artificial Immune Systems, LNCS 4163, 2006, pp. 404-417. The following features of the DCA differentiate the algorithm from other MS algorithms: (1) multiple signals are combined and are a representation of environment or context information; (2) signals are combined with antigen in a temporal and distributed manner; (3) pattern matching is not used to perform detection, unlike negative selection; and (4) cells of the innate immune system are used as inspiration, not the adaptive immune cells, and unlike clonal selection, no dynamic learning is attempted.

As described in the DCA literature, DCs can perform various functions, depending on their state of maturation. Modulation between these maturation states is facilitated by the detection of signals within the tissue, namely: (1) danger signals, (2) pathogenic associated molecular patterns (PAMPs), (3) apoptotic signals (safe signals), and (4) inflammatory cytokines. The DCA has been implemented successfully in various localized applications, which have made use of danger signals, PAMPs, and safe signals. However, existing DCA implementations have not made use of signals analogous to the inflammatory cytokines of DCs in the biological domain.

SUMMARY

The present application discloses an implementation of the DCA that detects anomalous behavior in various embedded network systems, ranging from embedded factory control systems to general computer networks. Unlike previous approaches, the DCA implementation described herein makes use of an inflammation signal to communicate information among the nodes of a distributed or centralized network.

In one example, a system comprises a local node, one or more connected nodes linked to the local node, and a Dendritic Cell Algorithm (DCA) module in the local lode. The DCA module comprises an inflammatory signal indicating a likelihood to the connected nodes that the local node has been attacked by malicious software.

The local node and connected node(s) may comprise: (a) a collection of discrete computing devices, (b) a collection of logical nodes within a single computing device, or (c) a combination of discrete computing devices and logical nodes. The system may comprise a distributed network. The system may comprise a centralized network having a central server and a plurality of client nodes. The local node may comprise a plurality of processes operating in parallel with the DCA module. The inflammatory signal may comprise a continuous variable having a value within the range of −1 to 1. The inflammatory signal may have a strength proportional to a degree of certainty that the local node has been attacked by malicious software. The DCA module may comprise: a plurality of sensors configured to measure raw sensor data; a plurality of indicators created based on raw sensor data measured by the sensors; a signal combiner; a tissue module; and a plurality of individual dendritic cell (DC) instances. The raw sensor data may comprise computer network information or individual processor information. The indicators may comprise one or more signals representative of a heartbeat, packet size, network address, bandwidth, or processor load. The signal combiner may sum the indicators. The signal combiner may average the indicators. The signal combiner may determine the median value of the indicators. The tissue module may manage a store of indicator signal and antigen signal, and provides data to the plurality of DC instances.

In another example, a method is disclosed for operating a computer network comprising a plurality of computing nodes. The method comprises running a Dendritic Cell Algorithm (DCA) module on each of the computing nodes and identifying a harmful antigen at a first computing node by observing abnormal activity based on predetermined criteria established by the DCA module running on the first computing node. The method further comprises transmitting an inflammatory signal from the DCA module of the first computing node to one or more additional computing nodes on the computer network.

The computer network may comprise a distributed network. The computer network may comprise a centralized network. The method may further comprise modulating the response to local signal changes at the one or more additional computing nodes. Running the DCA module on each computing node may comprise: initializing an individual Dendritic Cell (DC) instance within the DCA module; receiving raw sensor data from sensors of the DCA module; creating an antigen signal in a data processing event; processing the raw sensor data to create an indicator signal comprising a vector of the following signals: (a) PAMP, (b) Danger, (c) Safe, and (d) Inflammation signal; passing the indicator signal to a signal transformation event; passing the antigen signal to an antigen sampling event; correlating the indicator signal and sampled antigen signals based on their time stamps; and determining whether a maturation threshold has been reached and, if so, changing the DC instance from a correlating state to an information presenting state. The antigen signal may represent a program name, a file name, or a network address of a node.

In another example, a method is disclosed for operating a Dendritic Cell Algorithm (DCA) module on a first computing node linked to a computer network. The method comprises: monitoring an indicator signal comprising a vector of PAMP, Danger, and Safe signals, collected locally at the first computing node; receiving an inflammation signal from a second computing node linked to the computer network; and creating and aging out a plurality of individual Dendritic Cell (DC) instances. The method further comprises: calculating an overall mature context antigen value (MCAV) of the first computing node as individual DC instances age out; and transmitting a current node status signal to one or more additional nodes linked to the computer network.

The method may further comprise determining whether the MCAV of the first computing node is above a selected threshold before transmitting the current node status signal to one or more additional nodes linked to the computer network.

Figure 1:
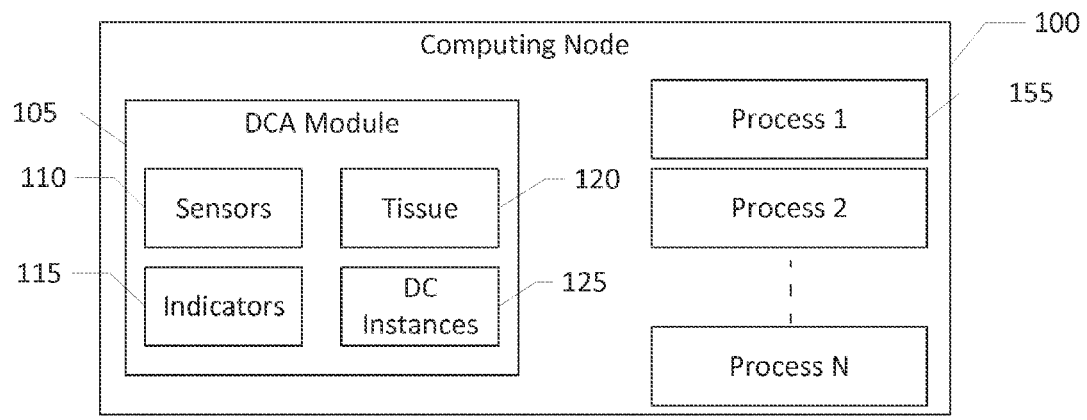
FIG. 1 is a block diagram illustrating one example of a computing node comprising a Dendritic Cell Algorithm (DCA) module.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

The present application discloses an implementation of the DCA that makes use of a known, but previously unused, feature of the DCA: inflammation, to signal of a possible attack among nodes of a distributed or a centralized network. As used herein, the term "network" may refer to a system with a plurality of discrete computing devices, a plurality of logical nodes within a single computing device (e.g., a plurality of virtual machines, individual computing processes, etc.), and/or a combination of discrete computing devices and logical nodes.

In some cases, as described below, each individual node within a network runs an instantiation of the DCA, which gathers "signals" from the local node, and regularly determines the potential for a particular "antigen" to be harmful, based on pre-determined criteria. The nodes are linked together through a network or other channels of communication. When an anomaly is detected by one node, it propagates an inflammation signal to other nodes on the network. This inflammation signal merely posits that an attack has been detected, but does not carry any details of the nature or mode of the attack. This approach helps to put other nodes on alert to be more sensitive to anomalous behavior, while minimizing the risk of confirmation bias.

FIG. 1 is a block diagram illustrating one example of a computing node 100 comprising a Dendritic Cell Algorithm (DCA) module 105. In some cases, the computing node 100 may comprise a discrete computing device (e.g., desktop computer, notebook computer, etc.), which may communicate with similar computing devices in a network. In other cases, the computing node 100 may comprise a logical "node" (e.g., virtual machine, computing process, etc.), which may operate in parallel with similar logical nodes within a single computing device. Therefore, as described above, a network of computing nodes may comprise a collection of discrete computing devices, a collection of logical nodes within a single computing device, and/or a combination of the two.

In the illustrated example, the computing node 100 comprises a plurality of processes 155 (labeled Process 1 through Process N FIG. 1) operating in parallel with the DCA module 105 within the computing node 100. In addition, the DCA module 105 comprises a plurality of sensors 110, indicators 115, a tissue module 120, and a plurality of individual dendritic cell (DC) instances 125. The operation and interaction of the components of the DCA module 105 are described below.

Figure 2:
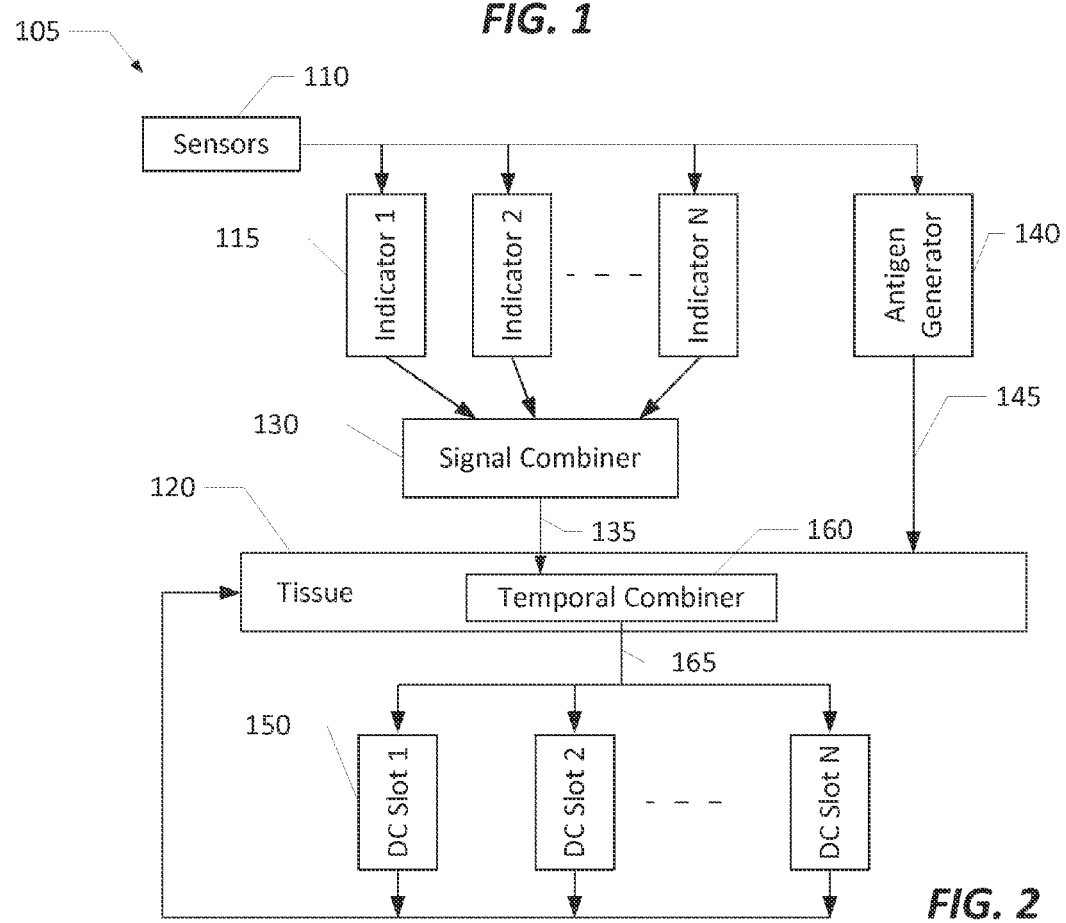
FIG. 2 is a block diagram illustrating one example of a DCA module.

FIG. 2 is a block diagram illustrating one example of a DCA module 105. In the example illustrated in FIG. 2, the DCA module 105 comprises a plurality of sensors 110, which measure raw sensor data, such as, for example, computer network information (e.g., packet data, etc.) and/or individual processor information. As shown in FIG. 2, the raw sensor data can be used to create a selected number of DCA indicators 115 (labeled Indicator 1 through Indicator N in FIG. 2), which may represent a wide variety of parameters. For example, in some cases, Indicator 1 may comprise a heartbeat or "keep alive" signal, Indicator 2 may comprise a packet size signal, and Indicator N may comprise a signal representing a sender's network address. Other examples of suitable indicators 115 may include signals indicative of parameters such as bandwidth, processor load, etc.

As shown in FIG. 2, the indicators 115 are combined by a signal combiner 130, which may perform a variety of suitable combination functions. For example, in some cases, the signal combiner 130 may sum the indicators 115, whereas in other cases, the signal combiner 130 may average the indicators 115. As yet another example, the signal combiner 130 may determine the median value of the indicators 115. Using a suitable combination function, the signal combiner 130 creates an aggregated indicator signal 135, which is provided as an input to the tissue module 120. In addition, the raw sensor data is used by an antigen generator 140 to create an antigen signal 145, which is also provided as an input to the tissue module 120.

An aggregated signal 135 and antigen 145 are created for each individual raw sensor "event." For example, in the case of network traffic, a raw sensor event r may comprise a packet, whereas in the case of processor load, a raw sensor event may comprise a selected time period (e.g., 0.1 seconds, etc.). The tissue module 120, in turn, includes a temporal combiner 160, which combines an array of one or more aggregated indicator signals 135 received over time, to generate a "DC-Seen" signal 165. In some cases, the temporal combiner 160 may average the aggregated indicator signals 135, whereas in other cases, the temporal combiner 160 may determine the maximum or median of the aggregated indicator signals 135. The temporal combiner 160 includes a "look back" period, which may correspond to selected time period or number of events.

In operation, the tissue module 120 manages the indicator signal 135 and the antigen signal 145, and provides the DC-Seen signal 165 to a plurality of individual DC instances 125 located in a plurality of DC slots 150 (labeled DC Slot 1 through DC Slot N in FIG. 2). As the individual DC instances 125 age out, they present the resulting data back to the tissue module 120, which aggregates the data across the plurality of individual DC instances 125.

Figure 3:
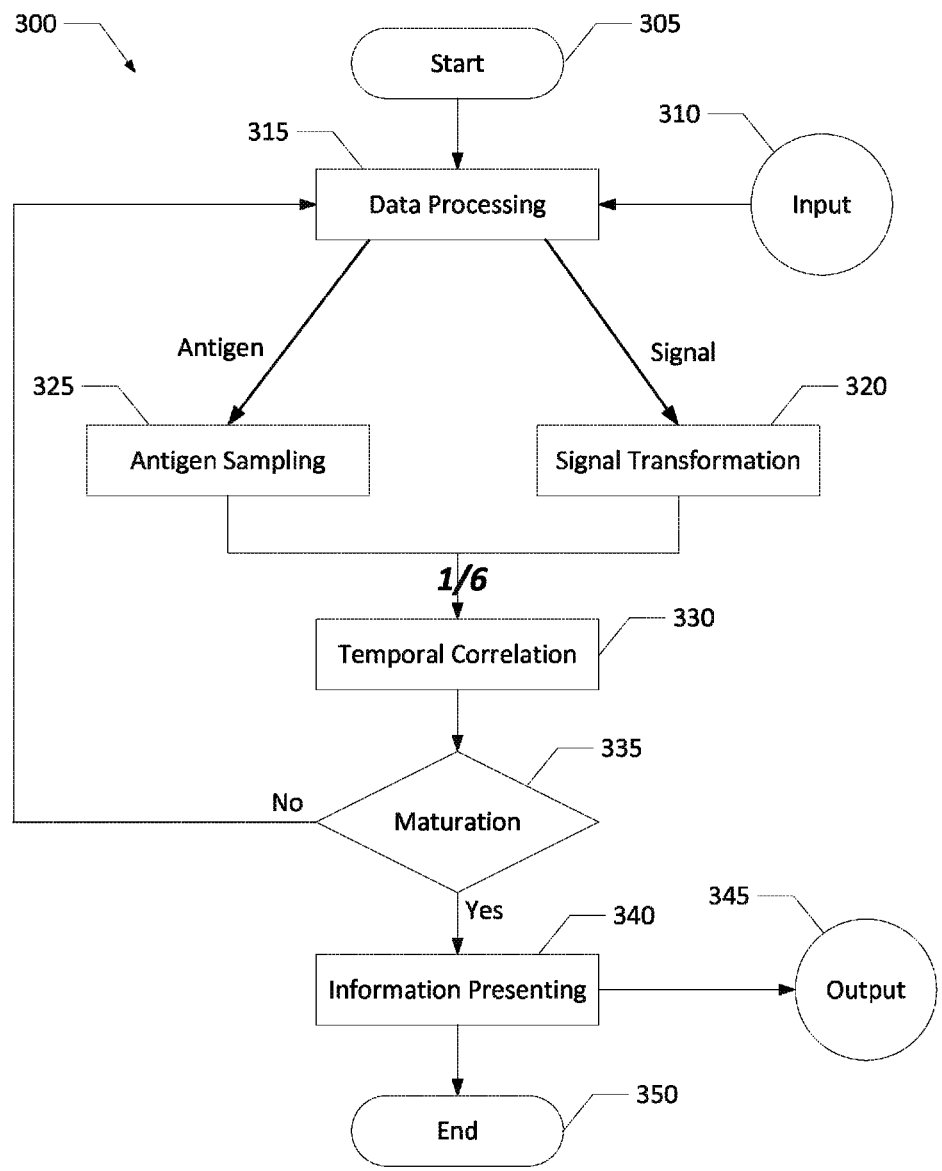
FIG. 3 is a flow chart illustrating a method of operating of an individual DC within a DCA module.

FIG. 3 is a flow chart illustrating an example of a process 300 for operating an individual DC instance 125 within a DCA module 105. In a first step 305, the DC instance 125 is created and initialized. During operation of the DC instance 125, as indicated at block 310, raw sensor data is provided by the sensors 110 of the DCA module 105. In a data processing event 315, an antigen signal 145 is created by the antigen generator 140, and the raw sensor data is processed to create an indicator signal 135. The antigen signal 145 typically represents an existing attribute of the system on which the DC instance 125 operates, such as, for example, the name of a program installed on the computing node 100, a file name, an address of another node 100 on the same network, etc. In addition, as known in the DCA art, the indicator signal 135 may comprise a vector of the following signals: (a) PAMP, (b) Danger, (c) Safe, and (d) Inflammation signal.

The indicator signal 135 is passed to a signal transformation event 320. The antigen signal 145 is passed to an antigen sampling event 325. In each DC instance 125, a single indicator signal 135 and zero, one or more antigen signals 145 can be fed to the DC instance 125. The processed indicator signals 135 and sampled antigen signals 145 are correlated by a temporal correlation event 330 based on their time stamps. In a decision block 335, the process 300 determines whether a maturation threshold has been reached. If not, the process 300 returns to the data processing event 315. The DC instance 125 repeats the events described above cyclically, until the maturation threshold is reached, which indicates that the DC instance 125 has acquired sufficient information for decision making.

Once the DC instance 125 reaches its maturation threshold, the DC instance 125 changes from a correlating state to an information presenting state. Based on the indicator signals 135 and the antigen signals 145 correlated by the temporal correlation event 330, the DC instance 125 determines whether any potential anomalies appeared within the input data. The results of this decision are presented by an information presenting event 340 as the output of the DC instance 125, as indicated at block 345. In a final step 350, the DC instance 125 is terminated, marking the end of the lifespan of the DC instance 1125. In many cases, the process 300 then returns to step 305, in which another DC instance 125 is created and initialized, and the process 300 is repeated.

Figure 4:
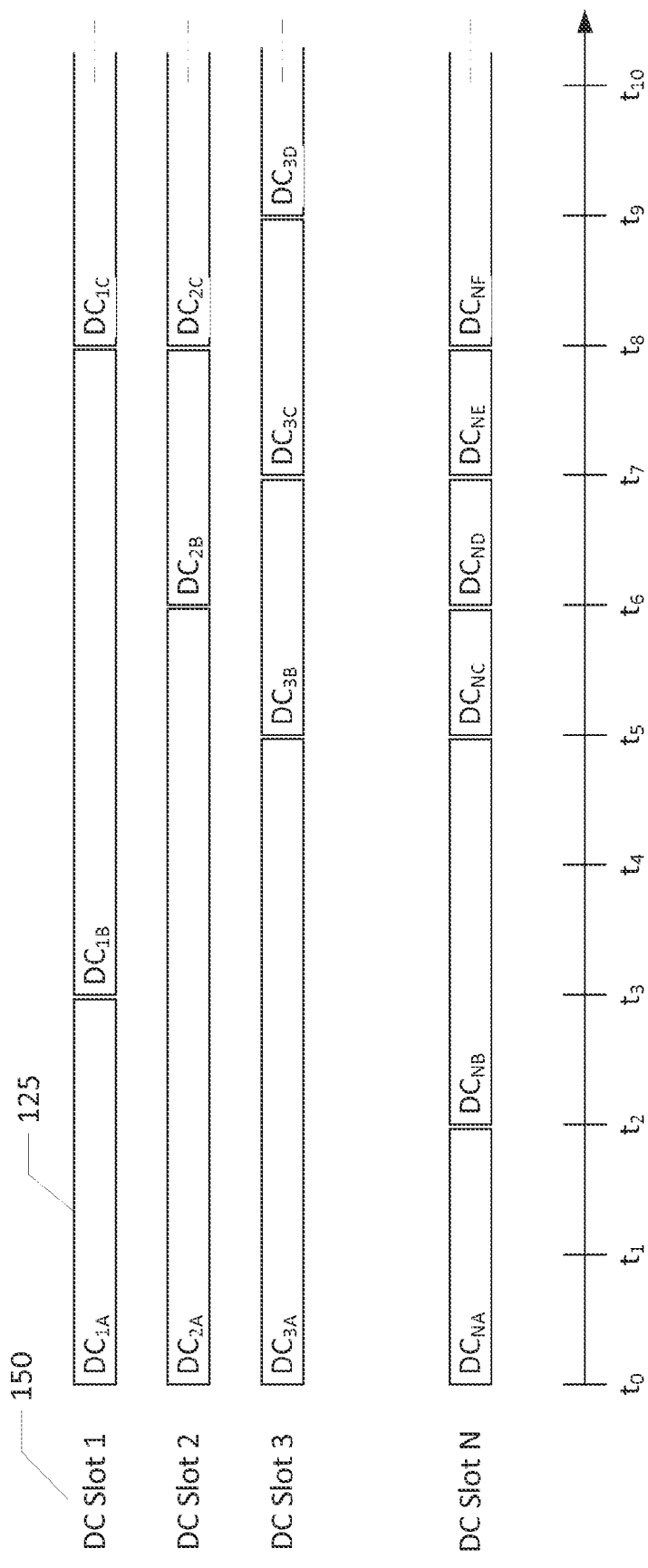
FIG. 4 is a timing diagram illustrating the operation of a plurality of dendritic cell instances operating in parallel.

FIG. 4 is a timing diagram illustrating the operation of a plurality of DC instances 125 (labeled $DC_{1A}$ through $DC_{NF}$ in FIG. 4), operating in parallel. In the illustrated example, the timing diagram includes a time axis beginning at time $t_0$ and divided into 10 substantially equal units. Each unit on the time axis may represent an interval such as 0.5 seconds, 1 second, 5 seconds, 10 seconds, or any other suitable time interval.

As described above, the DCA module 105 comprises a plurality of DC slots 150, in which the individual DC instances 125 operate. Each individual DC instance 125 has a randomly selected threshold (typically within a predetermined range) to "age out," or transition from the correlating state to the information presenting state (as determined in decision block 335 of FIG. 3). For instance, DC instance $DC_{1A}$ may have a threshold of about 4 units, DC instance $DC_{1B}$ may have a threshold of about 9 units, DC instance $DC_{1C}$ may have a threshold of about 6 units, and so on. As shown in FIG. 4, all of the DC instances 125 start at the same time, $t_0$, but they age out at different times, as determined by their respective maturation thresholds. For example, DC instance $DC_{NA}$ ages out at time $t_2$, DC instance $DC_{1A}$ ages out at time $t_3$, DC instance $DC_{3A}$ ages out at time $t_5$, DC instance $DC_{2A}$ ages out at time $t_6$, and so on.

Figure 5A:
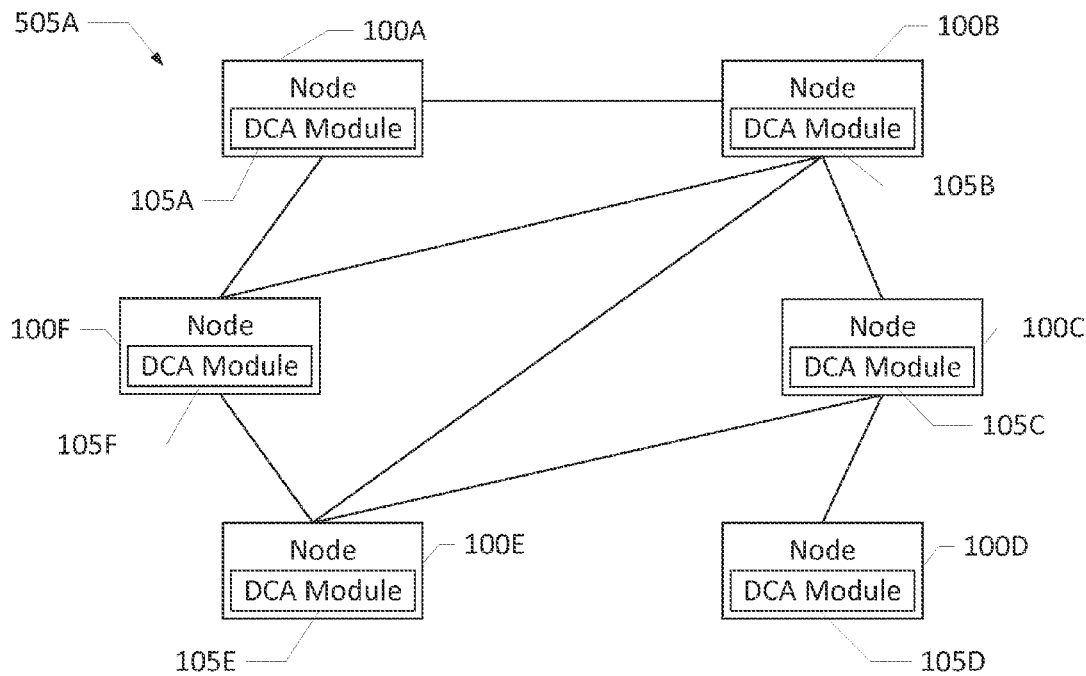
FIGS. 5A and 5B are block diagrams illustrating examples of networks with a plurality of computing nodes including DCA modules.

FIG. 5A is a block diagram illustrating one example of a distributed computer network 505A (e.g., peer-to-peer network, ad hoc wireless network, etc.), having a plurality of nodes 100, each including n Dendritic Cell Algorithm (DCA) module 105. In the particular example illustrated in FIG. 5A, the distributed network 505A comprises six nodes 100A-100F that are interconnected as shown. Any individual node 100 may be in communication with any other node 100 (or multiple other nodes 100) in the distributed network 505A. For example, node 100B is in communication with four other nodes 100 (i.e., nodes 100A, 100C, 100E, 100F), whereas node 100D is in communication with only one other node 100 (i.e., node 100C). Those of ordinary skill in the art will understand that the distributed network 505A may include a greater or fewer number of nodes 100, and that the interconnections between individual nodes 100 may vary widely from the example shown in FIG. 5A.

Figure 5B:
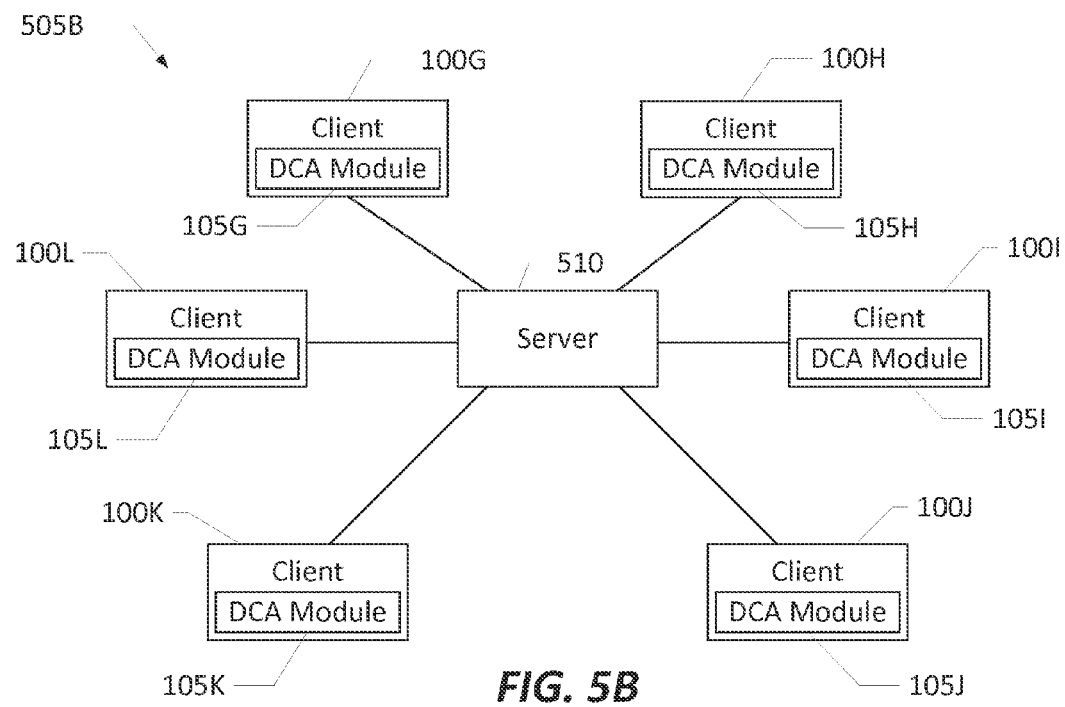

FIG. 5B is a block diagram illustrating one example of a centralized computer network 505B (e.g., client-server network, etc.), having a central server 510 in communication with a plurality of clients or nodes 100, each including a DCA module 105. In the particular example illustrated in FIG. 5B, the centralized network 505B comprises six nodes 100G-100L in communication with the central server 510 in a star network topology. Those of ordinary skill in the art will understand that the centralized network 505B may include a greater or fewer number of nodes 100, and that a variety of other suitable network topologies (e.g., bus network, ring network, etc.) may be employed.

In operation, the DCA modules 105 of the individual nodes 100 of either the distributed network 505A or the centralized network 505B constantly monitor for abnormal activity, which may be identified as a harmful antigen based on selected criteria, as described above in connection with FIG. 3. When such a harmful antigen is identified at a particular node 100, the corresponding DCA module 105 may transmit an inflammatory signal to the remaining nodes 100 on the network 505.

This inflammatory signal is analogous to the human immune system's inflammatory cytokines (e.g., interferon, tumor necrosis factor, etc.). The inflammatory signal is used to indicate to other nodes 100 that a possible attack is underway, and for the other nodes 100 to modulate their response to local signal changes. The inflammatory signal is preferably a continuous variable, which may range from −1 to 1 in some cases. Negative values can be used to indicate that an event should reduce the response to a given stimulus. For example, installing or upgrading a piece of software may often appear to be a malware attack, so a negative inflammatory signal value may be used to reduce the response for this particular event. The inflammatory signal is raised when one or more antigens have been detected as a possible invader, or a known event has occurred. The strength of the inflammatory signal may be proportional to the degree of certainty of the attack or the degree of severity of the attack.

In some cases, when the DCA module 105 of a node 100 of the centralized network 505B generates an inflammatory signal, the affected node 100 may transmit the inflammatory signal to the central server 510, which may, in turn, "broadcast" the inflammatory signal to all the other nodes 100 of the centralized network 505B. In other cases, when the DCA module 105 of a node 100 of the distributed network 505A generates an inflammatory signal, the affected node 100 may transmit the inflammatory only to the directly connected nodes 100 of the distributed network 505A.

For example, if the DCA module 105E of the node 100E generated an inflammatory signal, the node 100E may transmit the inflammatory signal to only the three directly connected nodes 100 (i.e., nodes 100B, 100C, 100F). In some cases, the receiving nodes 100 (i.e., nodes 100B, 100C, 100F, in this particular example) may further broadcast the inflammatory signal to other nodes 100, possibly with a decay factor to ensure against a feedback loop. The receiving nodes 100 may use the inflammatory signal to modulate the other indicator signals 135 collected for their respective DCA modules 105.

Like the human immune system, the inflammatory signal does not contain details about the specifics of the possible attack. Rather, the inflammatory signal merely indicates that a given node 100 may be experiencing something unexpected or problematic. Such an indication advantageously reduces the likelihood of so-called confirmation bias, i.e., a situation in which a node 100 is more likely to find a particular pattern increasing the sensitivity of the particular pattern search. In addition, if an attack is localized to a particular node 100, other nodes 100 that are unaffected will not be unfairly penalized.

Figure 6:
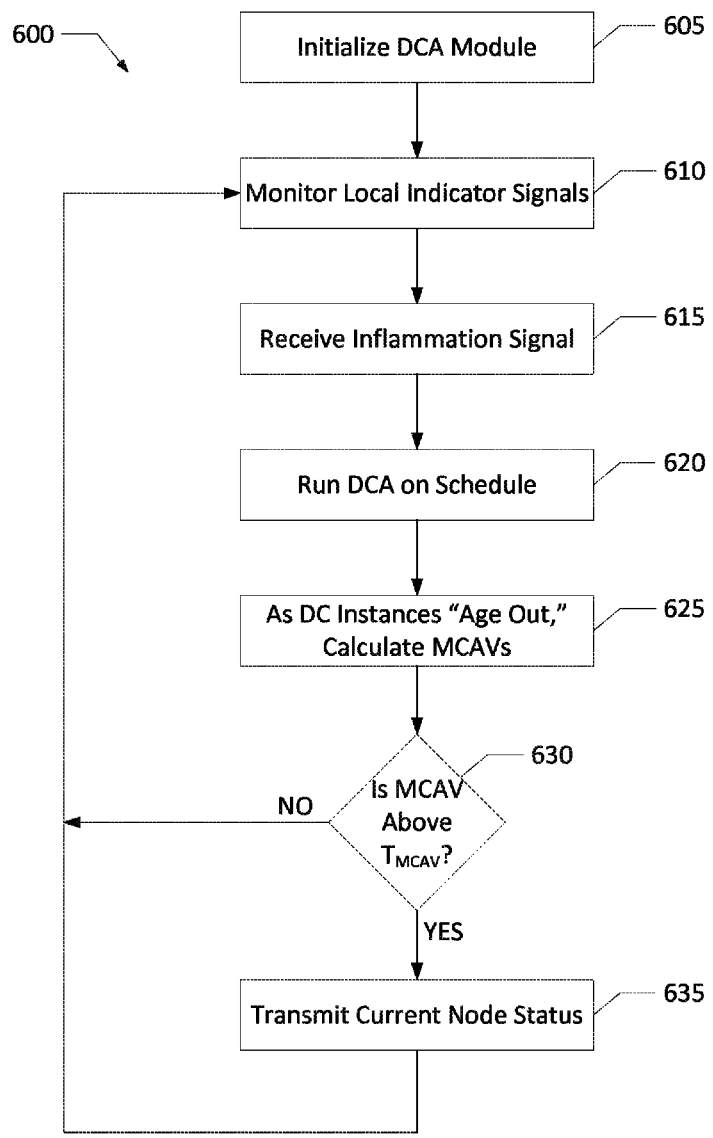
FIG. 6 is a flow chart illustrating the operation of a plurality of nodes in a network communicating signals generated by one or more DCA modules.

FIG. 6 is a flow chart illustrating the operation of a plurality of nodes 100 in a computer network 505 communicating signals generated by one or more DCA modules 105. In the illustrated example, the process 600 begins with a first step 605, in which the DCA module 105 of a given node 100 is initialized. In a next step 610, the DCA module 105 monitors the local indicator signals 135 (e.g., PAMP, Danger, and Safe) collected locally at the node 100. In a next step 615, the DCA module 105 receives an inflammation signal, which may be sent from another node 100 of a distributed network 505A or from the central server 510 of a centralized network 505B, as described above. In a next step 620, the DCA module 105 runs according to its respective schedule, with individual DC instances 125 in corresponding DC slots 150 being created and aging out at different intervals, as shown in FIG. 4. In a next step 625, as individual DC instances 125 age out, the DCA module 105 calculates an overall mature context antigen value (MCAV) of the computing node 100.

In some cases, the process includes an optional step 630, in which a determination is made as to whether the MCAV is above a selected threshold, $T_{MCAV}$. If not, the process returns to step 610 and repeats until the MCAV exceeds the selected threshold before proceeding to step 635. In other cases, the process proceeds directly to step 635, in which the DCA module 105 transmits the current node status signal to other nodes 100, regardless of whether the overall MCAV exceeds a threshold. In such cases, the current node status signal may indicate danger or distress at the transmitting node 100, or it may indicate simply that the transmitting node 100 is functioning normally. Accordingly, the DCA module 105 of a given node 100 can provide virtually continuous status updates to other nodes 100 of the network 505. In the case of a distributed network 505A, the DCA module 105 transmits the current node status signal to other connected nodes 100, whereas in the case of a centralized network 505B, the DCA module 105 transmits the current node status signal to a central server 510.

Figure 7:
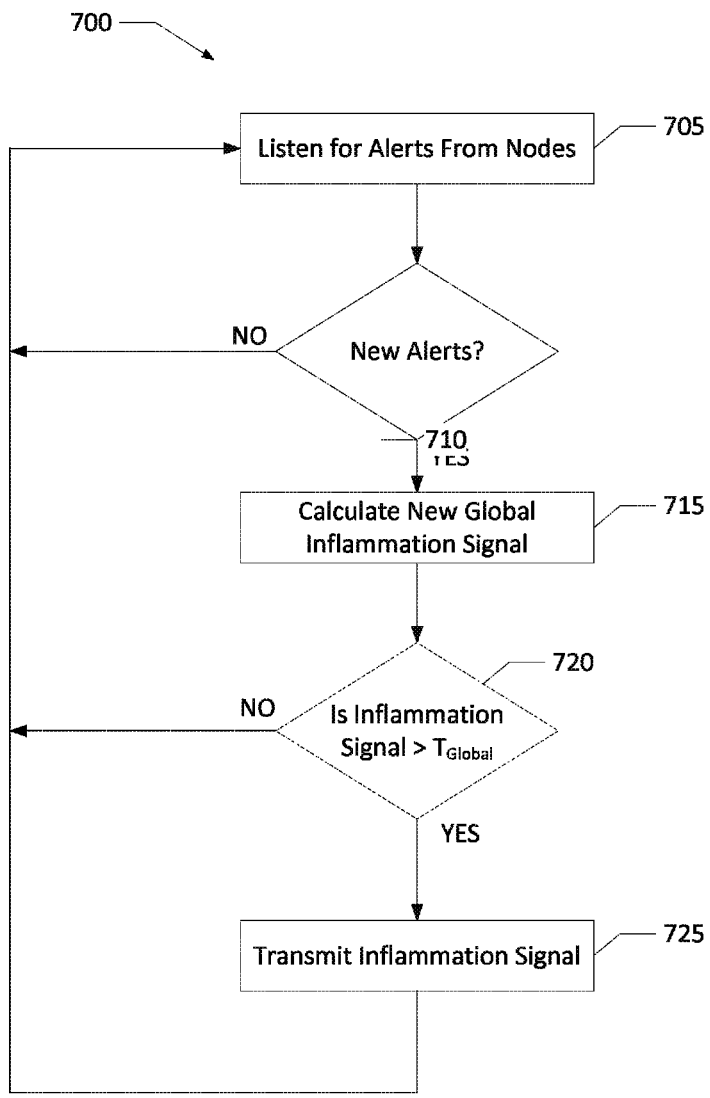
FIG. 7 is a flow chart illustrating the operation of a central server in a network having one or more nodes with a DCA module.

FIG. 7 is a flow chart illustrating the operation of a central server 510 in a centralized computer network 505B having one or more nodes 100 with a DCA module 105. In a first step 705 of the process 700, the central server 510 monitors for status signals from one or more nodes 100. As described above in connection with FIG. 6, such status signals may be generated and transmitted by the DCA module 105 of a node 100 following the calculation of t MCAV (e.g., at step 635 or 640 of FIG. 6). In a next step 710, a determination is made as to whether any new status signals have been received. If not, the process returns to the listening step 705 and repeats until a new status signal is received. Once that occurs, as shown at step 715, a new global inflammation signal is calculated for the centralized network 505B.

In some cases, the process includes an optional step 720, in which a determination is made as to whether the magnitude of the global inflammation signal is above a selected threshold, $T_{GLOBAL}$. If not, the process returns to the listening step 705 and repeats until the magnitude of the inflammation signal exceeds the selected threshold, $T_{GLOBAL}$. In other cases, the process proceeds directly to step 725, in which the central server 510 transmits the inflammation signal to the nodes 100 of the network 505B, regardless of whether the magnitude of the inflammation signal exceeds a threshold. Accordingly, the central server 510 can provide virtually continuous updates to the nodes 100 of the network 505B regarding the inflammation signal.

The systems and methods described above demonstrate a number of distinct advantages over previous approaches. For example, the DCA module 105 of the present application demonstrates consistently positive results, i.e., higher rates of detection, with lower rates of false positives, when compared with previous DCA implementations. In addition, the DCA module 105 exhibits a higher speed of detection that previous DCA implementations, especially in embedded network systems. Furthermore, the DCA module 105 can be run with minimal processor and memory requirements.

Although various embodiments have been shown and described, the present disclosure is not so limited and will be understood to include all such modifications and variations are would be apparent to one skilled in the art.

What is claimed is:

1. A system comprising:
   a local node;
   one or more connected nodes linked to the local node; and
   a Dendritic Cell Algorithm (DCA) module in the local node, the DCA module comprising an inflammatory signal indicating a likelihood to the connected nodes that the local node has been attacked by malicious software.

2. The system of claim 1, wherein the local node and connected node(s) comprise: (a) a collection of discrete computing devices, (b) a collection of logical nodes within a single computing device, or (c) a combination of discrete computing devices and logical nodes.

3. The system of claim 1, wherein the system comprises a distributed network.

4. The system of claim 1, wherein the system comprises a centralized network having a central server and a plurality of client nodes.

5. The system of claim 1, wherein the local node comprises a plurality of processes operating in parallel with the DCA module.

6. The system of claim 1, wherein the inflammatory signal comprises a continuous variable having a value within a range of −1 to 1.

7. The system of claim 1, wherein the inflammatory signal has a strength proportional to a degree of certainty that the local node has been attacked by malicious software.

8. The system of claim 1, wherein the DCA module comprises:
   a plurality of sensors configured to measure raw sensor data;
   a plurality of indicators created based on raw sensor data measured by the sensors;
   a signal combiner;
   a tissue module; and
   a plurality of individual dendritic cell (DC) instances.

9. The system of claim 8, wherein the raw sensor data comprises computer network information or individual processor information.

10. The system of claim 8, wherein the indicators comprise one or more signals representative of a heartbeat, packet size, network address, bandwidth, or processor load.

11. The system of claim 8, wherein the signal combiner sums the indicators.

12. The system of claim 8, wherein the signal combiner averages the indicators.

13. The system of claim 8, wherein the signal combiner determines the median value of the indicators.

14. The system of claim 8, wherein the tissue module manages a store of indicator signal and antigen signal, and provides data to the plurality of DC instances.

15. A method of operating a computer network comprising a plurality of computing nodes, the method comprising:
   running a Dendritic Cell Algorithm (DCA) module on each of the computing nodes;
   identifying a harmful antigen at a first computing node by observing abnormal activity based on predetermined criteria established by the DCA module running on the first computing node; and
   transmitting an inflammatory signal from the DCA module of the first computing node to one or more additional computing nodes on the computer network, wherein the inflammatory signal indicates a likelihood to the one or more additional computing nodes that the first computing node has been attacked by malicious software.

16. The method of claim 15, wherein the computer network comprises a distributed network.

17. The method of claim 15, wherein the computer network comprises a centralized network.

18. The method of claim 15, further comprising modulating the response to local signal changes at the one or more additional computing nodes.

19. The method of claim 15, wherein running the DCA module on each computing node comprises:
   initializing an individual Dendritic Cell (DC) instance within the DCA module;
   receiving raw sensor data from sensors of the DCA module;
   creating an antigen signal in a data processing event;
   processing the raw sensor data to create an indicator signal comprising a vector of the following signals: (a) pathogenic associated molecular patterns (PAMP), (b) Danger, (c) Safe, and (d) Inflammation signal;
   passing the indicator signal to a signal transformation event;
   passing the antigen signal to an antigen sampling event;
   correlating the indicator signal and sampled antigen signals based on their time stamps; and
   determining whether a maturation threshold has been reached and, if so, changing the DC instance from a correlating state to an information presenting state.

20. The method of claim 19, wherein the antigen signal represents a program name, a file name, or a network address of a node.

21. A method of operating a Dendritic Cell Algorithm (DCA) module on a first computing node linked to a computer network, the method comprising:
   monitoring an indicator signal comprising a vector of PAMP, Danger, and Safe signals, collected locally at the first computing node;
   receiving an inflammation signal from a second computing node linked to the computer network, wherein the inflammation signal indicates a likelihood that the second computing node has been attacked by malicious software;
   creating and aging out a plurality of individual Dendritic Cell (DC) instances;
   calculating an overall mature context antigen value (MCAV) of the first computing node as individual DC instances age out; and
   transmitting a current node status signal to one or more additional nodes linked to the computer network.

22. The method of claim 21, further comprising determining whether the MCAV of the first computing node is above a selected threshold before transmitting the current node status signal to one or more additional nodes linked to the computer network.

* * * * *